(12) United States Patent
Knorr

(10) Patent No.: US 9,273,957 B2
(45) Date of Patent: Mar. 1, 2016

(54) METHOD AND APPARATUS FOR CALIBRATING A SENSOR FOR THE MEASUREMENT OF MATERIAL THICKNESS OR SURFACE WEIGHT

(76) Inventor: Helmut Knorr, Utting Am Ammersee (DE)

( * ) Notice: Subject to any disclaimer, the term of this patent is extended or adjusted under 35 U.S.C. 154(b) by 332 days.

(21) Appl. No.: 13/422,388

(22) Filed: Mar. 16, 2012

(65) Prior Publication Data

US 2012/0234073 A1 Sep. 20, 2012

(30) Foreign Application Priority Data

Mar. 18, 2011 (DE) .......................... 10 2011 014 518

(51) Int. Cl.
*G01B 21/08* (2006.01)
*G01B 11/06* (2006.01)
*G01B 17/02* (2006.01)

(52) U.S. Cl.
CPC ............ *G01B 21/08* (2013.01); *G01B 11/0625* (2013.01); *G01B 17/02* (2013.01)

(58) Field of Classification Search
CPC .... G01B 17/02; G01B 21/08; G01B 11/0625; G01B 11/06; G01B 11/0691; G01B 21/045; G01B 2210/42; G01B 2210/44; G01N 33/346; G01N 2291/0237; G01N 2291/02854
USPC .......... 73/1.13, 1.81, 1.82, 1.89, 159
See application file for complete search history.

(56) References Cited

U.S. PATENT DOCUMENTS

| | | | | |
|---|---|---|---|---|
| 4,545,251 A * | 10/1985 | Uchida et al. .................... 73/631 |
| 4,676,647 A * | 6/1987 | Kikkawa et al. .............. 356/632 |
| 4,810,894 A * | 3/1989 | Nagao et al. ............. 250/559.27 |
| 5,113,358 A * | 5/1992 | Reber ........................... 702/171 |
| 5,138,178 A * | 8/1992 | Wong et al. .............. 250/559.28 |
| 5,327,770 A * | 7/1994 | Hindle ............................. 73/863 |
| 5,398,538 A * | 3/1995 | Williams et al. ............... 73/1.37 |

(Continued)

FOREIGN PATENT DOCUMENTS

| | | |
|---|---|---|
| DE | 4236436 A1 | 7/1994 |
| DE | 20109119 U1 | 5/2002 |

(Continued)

OTHER PUBLICATIONS

Machine translation of DE102009027428A1 downloaded May 1, 2014.*

*Primary Examiner* — Peter Macchiarolo
*Assistant Examiner* — Natalie Huls
(74) *Attorney, Agent, or Firm* — Peters Verny, LLP

(57) ABSTRACT

A method is provided for calibrating a sensor used for surface weight measurement or thickness measurement on a material sheet via transmission measurement and/or reflection measurement. The method may include: providing a two-dimensional calibration sample with a known surface weight; detection of the transmission values and/or the reflection values of the calibration sample via the sensor on a plurality of different positions two-dimensionally or areally distributed across the surface of the calibration sample; and the detection of the calibration value for the sensor via calculation of average from the plurality detected transmission values and/or reflection values and the composition of the average transmission and reflection values with the known surface weight of the calibration sample. Also provided is a method for measurement of layer thickness and/or surface weight of material sheets using the calibration method, as well as an apparatus for layer thickness measurements and/or surface weight measurement.

11 Claims, 1 Drawing Sheet

(56) References Cited

U.S. PATENT DOCUMENTS

| | | | |
|---|---|---|---|
| 5,485,082 A * | 1/1996 | Wisspeintner et al. | 324/202 |
| 5,621,173 A | 4/1997 | Knorr | |
| 5,780,744 A * | 7/1998 | Hall et al. | 73/597 |
| 5,805,291 A * | 9/1998 | Calvin et al. | 356/429 |
| 6,441,905 B1 * | 8/2002 | Tojyo et al. | 356/429 |
| 6,763,721 B2 * | 7/2004 | Wunderer et al. | 73/602 |
| 2011/0125442 A1 | 5/2011 | Schallmoser et al. | |
| 2012/0247212 A1 * | 10/2012 | Knorr | 73/632 |

FOREIGN PATENT DOCUMENTS

| | | |
|---|---|---|
| DE | 102009011122 A1 | 11/2009 |
| DE | 102009027428 A1 | 1/2011 |
| JP | 2000155022 A | 6/2000 |

* cited by examiner

METHOD AND APPARATUS FOR CALIBRATING A SENSOR FOR THE MEASUREMENT OF MATERIAL THICKNESS OR SURFACE WEIGHT

RELATED APPLICATIONS

This application claims the benefit of German patent application number DE 10 2011 014 518.4 filed Mar. 18, 2011, the content of which is incorporated by reference herein in its entirety.

TECHNICAL FIELD

The invention relates to a method for calibrating a sensor which is used for measurement of thickness and/or surface weight (weight per unit area) of a material sheet.

BACKGROUND

From DE 42 36 436 A1 a measurement method is known for the contact-free determination of the surface weight of thin material sheets using ultrasound. In this method, the transmission absorption of an ultrasonic beam emitted through a sheet material is determined using an ultrasonic transmitter and ultrasonic receiver. The surface weight is calculated using the absorption and a calibration factor.

From DE 201 09 119 U1 another apparatus for thickness measurement of material sheets is known. There, the material sheet is drawn over a roller and the thickness measurement is executed by a sensor mounted on a dolly which traverses back and forth over the roller.

There is a need for providing a method for improved calibration of a sensor. Furthermore, there is a need for providing an improved method or an improved apparatus for measurement of layer thickness and/or surface weight of a material sheet.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a method for calibrating a sensor is provided. The sensor is used for determining the surface weight and/or the material thickness of a material sheet or film material (in the following generally reference is made to material sheet which also includes film or foil). The measurement of the layer thickness or the surface weight can be implemented exclusively by transmission measurement, in which a transmission unit of the sensor sends a measurement signal through the material sheet to the opposite side where it is received by a receiving unit of the sensor. The layer thickness or surface weight can be determined from the attenuation of the signal at its passage (transmission) through the material sheet. Alternatively, the layer thickness is determined based on the signal reflected by the material sheet. In this case, the signal transmitter and the signal receiver of the sensor are arranged on the same side of the material sheet. As a further alternative, the sensor has a transmitter at the first side of the material sheet, a first receiver at the first side of the material sheet and a second receiver at the second side of the material sheet, wherein the transmission is measured by the second receiver and the reflection is measured by the first receiver.

By the calibration method, the sensor that is to be calibrated (which is used in the normal measurement mode for thickness measurement and/or surface weight measurement as mentioned previously) is calibrated using a two-dimensional or areal calibration sample. For this purpose, a plurality of transmission values and/or reflection values are detected, wherein the values are detected at different or distinct positions which are two-dimensionally or areally distributed across the calibration sample.

In some implementations, the calibration sample is a reference material with a known surface weight (for example a surface weight which has been previously determined with calibrated methods), which is then used as a reference standard for the ongoing control of the layer thickness and/or the surface weight measurement of the material sheet. It is also advantageous in case the calibration sample is a round punch piece having a surface area of one square decimetre, whose surface weight has been determined by weighing it in a precision weighing machine.

From the plurality of values detected at the different positions of the calibration sample, an average value of the transmission and/or reflection values is calculated (if applicable, transmission separately and reflection separately). The resulting average value is mathematically linked to the known surface weight of the calibration sample, so that this calibration value can be used for calibrating the thickness measurement and/or surface weight measurement of the sensor during material sheet measurement. A calibration curve of the signal transmission may be generated or calibrated (the course of the transmission intensity in dependency of the layer thickness and/or surface weight, if measurement is conducted in transmission or in combination of transmission and reflection). Alternatively, a calibration curve of the signal reflection may be generated or calibrated (the course of the reflection intensity in dependency of the thickness and/or the surface weight, if measurement is done in reflection or in combination reflection/transmission).

Since a transmission and/or reflection value is detected not only on a single position of the calibration sample but on different positions two-dimensionally or areally distributed over the sample, layer thickness deviations or surface weight deviations of the calibration sample are averaged, so that the error of sensor calibration is reduced corresponding to the averaging. Due to the higher precision of the sensor calibration, the layer thickness measurement and/or surface weight measurement of the material sheet is more exact.

In one embodiment, the positions two-dimensionally or areally distributed over the calibration sample are positionally approached or indexed by rotating the calibration sample relative to the sensor. This rotation can be implemented with a simple mechanical construction and, while the calibration sample is rotating, positions of the calibration sample within a circular path are positionally approached.

Alternatively or additionally, the positions at the calibration sensor are positionally approached by translatory movement of the sensor relative to the calibration sample and/or by translatory movement of the calibration sample relative to the sensor. A rotation of the calibration sample can, for example, be combined with a translator movement of the sensor. In the case of such a combination, spirally positioned locations or positions which are arranged on different circle diameters can be travelled to.

During the rotation of the calibration sample as well as during the shift via translation (translational movement), the movement or positional approach to the two-dimensional or areal distributed positions can be done one by one or can be done continuously. When the positions are positionally approached one by one, the position is positionally approached, the measurement is executed, and then the next position is positionally approached and the measurement is executes there. In continuous travel or while moving along the two-dimensionally or areally distributed positions, the measurement is executed while the rotation or translation is executed.

In some implementations, the measurement of the transmission values and/or reflection values is executed continuously or quasi-continuously, while the calibration sample is continuously moving relative to the sensor and/or while the sensor is continuously moved relative to the calibration sample. Quasi-continuously here means that the measurement value detection with the sensor is executed in measurement intervals, in the sequence signal impulse transmitting—signal receiving—signal processing as is for example determined by the digital processing rate for the received signal. A continuous detection is done, for example, by analog or digital integration of the continuously transmitted and received measurement signal.

In the method of layer thickness measurement and/or surface weight measurement of a material sheet, a calibration of the sensor is executed before, during and/or after determination of the layer thickness and/or the surface weight of the material sheet as described above. The measurement of the layer thickness and/or surface weight of the material sheet is preferably executed by moving the (calibrated or not yet calibrated) sensor transverse to the longitudinal direction in which the material sheet is moving. The transmission and/or reflection of the material sheet is detected during the transverse movement of the sensor. The layer thickness and/or the surface weight of the material sheet is determined by calculation based on the detected transmission and/or reflection values and by using a calibration value or as the case may be a calibration curve, either of which in turn was calibrated or will be calibrated by calibrating the sensor.

In one embodiment of the measurement method, the calibration of the sensor using the calibration sample is preferably executed in predetermined time intervals. However, a calibration can be triggered based on other incidents, for example, when a temperature drift in the production environment or measurement environment of the material sheet has been discovered, at a batch change of the starting material for the material sheet, or similar.

In some implementations, a sensor unit of a material sheet transportation device is assigned to an apparatus for determining layer thickness and/or surface weight of a material sheet. At the sensor unit a sensor for detecting transmission values and/or reflection values of the material sheet is moveable in a direction transverse to the material sheet which is transported longitudinally. The sensor can be traversed back and forth by and along the sensor unit, for example, between the outer longitudinal edges of the material sheet. Thereby for example the lateral distribution of the layer thickness and/or the material weight is monitored during a production process.

The apparatus may include a sensor calibration position in which the sensor is moved out of the material sheet measurement section and is positioned at a support device having a calibration sample, which is arranged at the sensor calibration position. In the sensor calibration position the sensor is moved relative to the calibration sample and/or the calibration sample is moved relative to the sensor by an actuator or drive.

In an embodiment, a rotational and/or linear movement is provided by a rotational and/or linear actuator or drive, which moves the calibration sample held in the support device relative to the sensor. Additionally or alternatively, when being in the sensor calibration position, the sensor can be moved two-dimensionally or areally over the calibration sample held by the support device—or at least in one linear direction, preferably in the transverse direction to the material sheet.

In some implementations, the sensor is an ultrasonic sensor whose measurement signal for layer thickness measurement and/or surface weight measurement is an ultrasonic impulse. Alternatively, an optical sensor is used which uses a laser beam or a light emitting diode beam. In a further alternative, the sensor is a radiation sensor which receives and transmits gamma radiation and/or beta radiation.

In the embodiment and as described above, the sensor can be constructed exclusively as a transmission unit, in which only the absorption of the transmission of the sensor signal by the material sheet is determined or detected. Alternatively, the sensor unit is exclusively a reflection unit, in which the reflection of the measurement signal from the material sheet or from the back side of the material sheet is detected or determined. Alternatively, the sensor unit is a combination of transmission measurement unit and reflection measurement unit, in which both the attenuation of the sensor signal in reflection as well as in transmission are determined. In the case of such a transmission and reflection measurement, one value may be used for a plausibility check of the other value or and/or may be used for averaging for the determination of layer thickness and/or surface weight.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
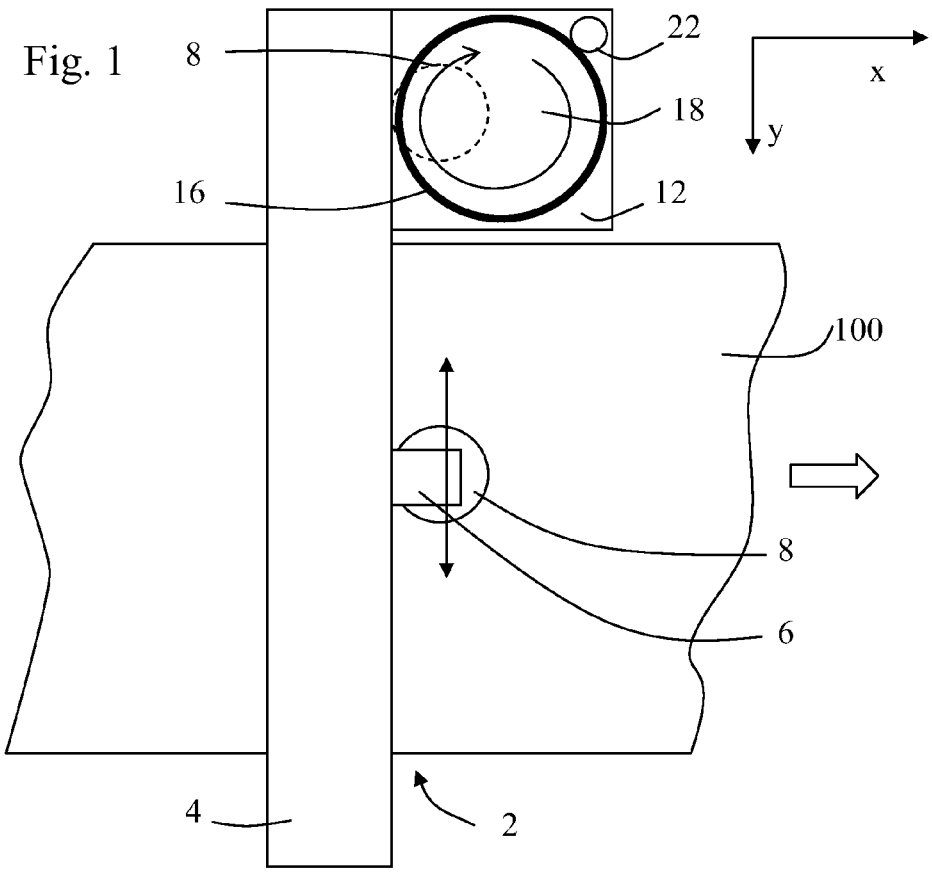
FIG. 1 is a schematic representation of a surface weight measurement unit with a calibration station.

FIG. 1 shows a schematic top view of a surface weight measurement unit 2, which is arranged on a material sheet 100 being moved in a longitudinal direction x. For purposes of simplicity, the transport means for moving the material sheet 100 is not depicted. In the figures, the proportions and relative spacing are not represented to scale but instead are represented in such a manner as to illustrate the invention.

As a basic component, the surface weight measurement unit 2 has a transversal portal 4, which extends above and below the material sheet 100 over the full width of the material sheet and beyond. The transversal portal 4 has a slit shaped opening through which the material sheet 100 is transported in longitudinal direction x. On a carriage (which is not visible in FIG. 1) a carriage console 6 is supported on the upper cross beam of the transversal portal 4 (can be seen in FIG. 1 from above as a bar running in y-direction). The carriage can be moved by a linear drive or actuator, reversing crosswise (in y-direction) to the material sheet 100.

The carriage console 6 supports a transmission head 8, which is movable over the entire width of the material sheet 100 by the carriage console 6. The transmission head 8 emits an ultrasonic pulse onto the upper surface of the material sheet and the ultrasonic signal propagates, while being attenuated, through the material sheet 100 to its lower surface, where the attenuated signal exits and impinges on the receiver head 10 being arranged opposing to the transmission head 8. The receiver head 10 is arranged on a carriage console (not shown) which is movable over the entire width of the material sheet 100 and up to the calibration position in the standby and calibration station 12. The lower carriage (not shown) supporting the receiver head 10 is moved on by a linear drive or actuator supported at and moving along the lower cross beam of the transversal portal 4. The movement of the lower carriage console is synchronized with the movement of the upper carriage console 6 such that the transmission head 8 and the receiver head 10 are always in an opposing arrangement during movement over the width of the material sheet 100 and in the calibration position as indicated in FIG. 2.

Figure 2:
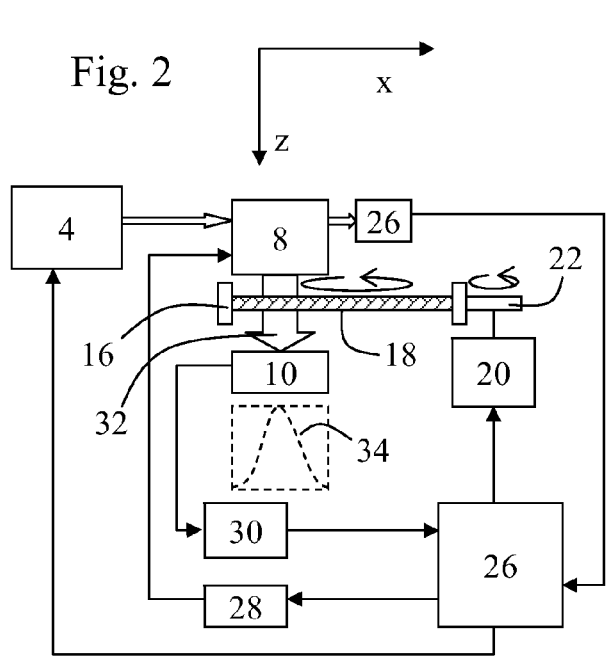
FIG. 2 is a schematic representation of the measuring and control arrangement when the sensor is positioned in the calibration station.

In the schematic cross-section view of FIG. 2, the arrangement of the transmission head 8 and receiving unit 10 are represented in a side view; in this side view the y-direction is vertical to the plane of projection in FIG. 2. The ultrasonic transmission beam originating from the transmission head 8 is depicted at 32. In the parking position 14 of the transmission head 8, the ultrasonic transmission beam 32 penetrates the calibration sample 18 and impinges on the receiver head 10.

The receiver head 10 is also mounted on a carriage at the lower cross beam (not shown) of the transversal portal 4 and is moved synchronous with the transmission head 8 in y direction. At the same time, the synchronous movement of the transmission head 8 and the receiver head 10 are such, that these are positioned on an axis in z direction collinear to one another.

FIG. 1 further shows a standby and calibration station 12 of the surface weight measurement unit 2. The standby and calibration station 12 is laterally offset to the material sheet, thus in y-direction or transversal direction to the material sheet 100. The standby and calibration station 12 has a parking position 14 in which both the transmission head 8 as well as the receiver head 10 on the opposite side are parked during measurement interruptions or for calibrating of the transmission/receiver unit 8, 10.

There is a pivot-mounted clamping ring 16 in the standby and calibration station 12, which is rotated via a pinion gear 22 on its exterior. As can be seen in FIG. 2, the pinion gear or gear wheel 22 is driven by a drive motor 20. The pinion gear 22 meshes with a ring gear formed at the exterior of the clamping ring 16 so that the rotational speed or the angular position of the clamping ring 16 can be controlled by the drive motor 20. In the clamping ring 16 a calibration sample 18 is clamped or supported. The calibration sample 18 is a round punch of standard material suitable for the calibration. The round punch has a surface of one square decimetre, so that the surface weight of the punch can be determined simply by weighing it on a precision weighing machine. The calibration standard in form of the calibration sample 18 represents a reference value for the thickness and/or the surface weight of the material sheet 100 and is used for repeated calibration of the transmission/receiver unit comprised of transmission head 8 and receiver head 10.

FIG. 2 shows, in addition to the schematic side view of the transmission head 8 and receiver head 10, the relative position of the calibration sample 18. Likewise, the control and monitoring electronics for the surface weight measurement unit 2 is represented in the form of a block diagram. Using position sensor 24, it can be determined whether the transmission head 8 and the receiver head 10 have reached the correct park position 14 in order to, for example, execute the calibration. The position sensor 24 sends its signal to a control unit 26 of the surface weight measurement unit 2.

The control unit 26 controls a transmission controller 28. For example, the transmission controller 28 receives its supply voltage and gain setting signal for setting the signal amplification from the control unit 26. Along with the specified signal amplification, an impulse signal, which is also received from the control unit 26 is amplified for the transmission head 8. The transmission controller 28 sends the amplified signal to the transmission head 8, which converts the voltage signal to the ultrasonic impulse 32.

The ultrasonic impulse received at the receiver head 10 is converted into an electrical signal and is fed to a receiver controller 30. The receiver controller implements signal processing and supplies the processed signal to the control unit 26. The receiver controller 30, for example, includes a digital signal processor, which, by proper programming via the control unit 26, will provide a signal processing algorithm, in order to execute the computationally intensive signal processing at the level of the receiver controller 30.

FIG. 2 also shows at 34 the transmission signal intensity distribution along the diameter of the active ultrasonic transmission surface of the transmission head 8. There, the approximately Gaussian shape of the intensity distribution can be seen, the maximum intensity is in the center area.

In order to compensate for thermal drifts, ageing processes, contamination at the transmission and receiver path of the ultrasonic signal 32 and similar effects, the measurement of the surface weight or the layer thickness of the material sheet 100 is interrupted in predefined time intervals for calibration. For this purpose, the transmission head 8 and the receiver head 10 are moved sideways out of the measurement area (width of the material sheet 100) and into the parking position 14. If the position sensor 24 detects position of the transmission head 8 and the receiver head 10 to be correct, the control unit 26 controls the motor 20 in such a manner so that the calibration sample 18 clamped in the clamping ring 16 is rotated between the transmission head and receiving head. The centre of the transmission/receiver area of the transmission head 8 and the receiver head 10 is radially offset to the centre of the calibration sample 18, so that the centre of the transmission/receiver head is moved on a circular path relative to the calibration sample.

While the calibration sample 18 is being rotated, the transmission head 8 is continuously (and repeatedly) sending ultrasonic impulses which are received by the receiver head 10. Thus, the transmission values from the calibration sample 18 can be measured at different positions two-dimensionally or areally distributed over the surface area. The measured vales are recorded with the control unit 26. After a single rotation or a plurality of rotations of the calibration sample 18, the control unit 26 calculates an average value from the measured transmission values and uses this average value for calibrating the calibration curve for the surface weight measurement or respectively for the layer thickness measurement.

Figure 3:
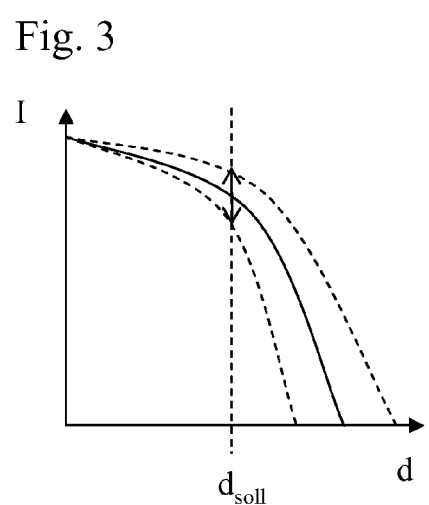
FIG. 3 is a curve for intensity versus surface weight or layer thickness and its recalibration.

FIG. 3 shows, in an exemplary manner and schematically, a calibration curve for the intensity I of the transmission T of the ultrasonic signal 32 in dependency of thickness d (the same is valid for the surface weight) of the material sheet 100. The dependency of the intensity I of the sheet or layer thickness d using the previous calibration value can be seen clearly from the solid line. If the calculation of the average of the previously described transmission measurement results in a deviation of the calibration value for the layer thickness d or the surface weight, then the calibration curve will be corrected up or down, as indicated by the dashed curves. Thus, after the calibration has been made, a new calibration curve (FIG. 3) is available and the layer thickness measurement transverse to the material sheet 100 can be continued using the new calibration curve, so that the surface weight measurement or layer thickness determination can be carried out with high precision.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. An apparatus for determining the layer thickness and/or surface weight of a material sheet, the apparatus comprising:
    a sensor unit comprising:
    a sensor for detecting transmission values and/or reflection values of the material sheet,
    a sensor moving unit having a carriage console supporting the sensor;
    a sensor calibration station, at which the sensor is positioned outside the material sheet measurement path, wherein the sensor calibration station is positioned laterally offset to the material sheet to be measured, wherein the carriage console is adapted to move the sensor in a transverse direction (y) over the entire width of the material sheet and to the sensor calibration station;
    a support device for supporting a two-dimensional or areal calibration sample, wherein in the sensor calibration station the sensor is moveable relative to the calibration sample being held in the support device and/or the calibration sample is moveable relative to the sensor and wherein the two-dimensional calibration sample is a sample having a known surface weight; and
    a control unit which is adapted
        to record transmission and/or reflection values detected on different positions two-dimensionally or areally distributed over the areal calibration sample, and
        to calculate an average value from the recorded thickness and/or reflection values of the calibration sample, whereby the error of sensor calibration is reduced corresponding to the averaging, and
        to combine the average value of the transmission and/or reflection with the known surface weight of the calibration sample;
    wherein the support device has a rotational and/or linear drive for rotationally and/or translatory moving the supported calibration sample relative to the sensor in the sensor calibration station.

2. The apparatus according to claim 1, wherein the sensor is an ultrasonic sensor, an optical sensor or a radiation sensor.

3. The apparatus according to claim 1,
    wherein the sensor comprises a signal source for transmitting a signal which is directed to one of the surfaces of the two-dimensional calibration sample, and
    wherein the sensor comprises a receiver for receiving,
    wherein the receiver is arranged on the same side of the calibration sample with respect to the signal source and receives the signal which is reflected by the calibration sample or the receiver is arranged at the opposite side of the calibration sample with respect to the signal source and receives the signal transmitted through the calibration sample; or
    wherein the sensor comprises a first receiver which is arranged at the same side of the calibration sample with respect to the signal source and which receives the signal reflected by the calibration sample, and the sensor comprises a second receiver which is arranged at the opposite side of the calibration sample with respect to the signal source and which receives the signal transmitted through the calibration sample.

4. The apparatus according to claim 1, wherein the calibration sample is arranged at a parking and/or maintenance position for the sensor.

5. The apparatus according to claim 1, wherein the calibration sample is arranged in extension of the transverse direction to the material sheet which is to be measured and which longitudinally moves.

6. A method for calibrating the sensor in the apparatus of claim 1 used for surface weight measurement and/or thickness measurement of a material sheet, wherein the sensor is operated for transmission measurement and/or reflection measurement, the method comprising:
    providing the two-dimensional calibration sample having a known surface weight;
    detecting the transmission values and/or the reflection values of the calibration sample using the sensor at a plurality of distinct positions distributed over the area of the calibration sample; and
    determining the calibration value for the sensor by calculating the average based on the plurality of detected transmission values and/or reflection values and by combining the average value of the transmission and/or reflection with the known surface weight of the calibration sample.

7. The method according to claim 6, wherein the plurality of positions distributed over the area of the calibration sample are positionally approached or indexed by rotation of the calibration sample.

8. The method according to claim 6, wherein the plurality of positions distributed over the area of the calibration sample are positionally approached or indexed by translatory shifting the sensor relative to the calibration sample and/or by translatory shifting the calibration sample relative to the sensor.

9. The method according to claim 6, wherein the plurality of transmission values and/or reflection values are detected by continuous or quasi-continuous detection during continuous movement of the calibration sample relative to the sensor and/or during continuous movement of the sensor relative to the calibration sample.

10. A method for measuring the layer thickness and/or the surface weight of a material sheet using the apparatus of claim 1 and of calibrating the sensor of said apparatus, the method comprising:
    moving the sensor transverse (y) to the longitudinally (x) transported material sheet and detecting transmission values and/or reflection values of the material sheet;
    determining the layer thickness and/or the surface weight of the material sheet or the respective distribution over the material sheet by calculation using the detected transmission values and/or reflection values and a calibration value or a calibration curve; and
    calibrating the sensor wherein the average calibration value, having been determined using the calibration sample, is used for determining the layer thickness and/or the surface weight or used for the recalibration of the calibration curve.

11. The method according to claim 10, wherein the calibration measurement is executed after time intervals of measurement of the layer thickness and/or the surface material of the material sheet.

* * * * *